United States Patent
Vasseur et al.

(10) Patent No.: US 7,710,902 B2
(45) Date of Patent: May 4, 2010

(54) PATH DIVERSITY FOR CUSTOMER-TO-CUSTOMER TRAFFIC

(75) Inventors: Jean-Philippe Vasseur, Dunstable, MA (US); Jim Guichard, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 591 days.

(21) Appl. No.: 11/604,624

(22) Filed: Nov. 27, 2006

(65) Prior Publication Data
US 2008/0123651 A1 May 29, 2008

(51) Int. Cl.
*H04L 12/56* (2006.01)
*H04J 1/16* (2006.01)

(52) U.S. Cl. .......................... 370/254; 370/228; 370/230

(58) Field of Classification Search ................ 370/392, 370/228, 230, 254
See application file for complete search history.

(56) References Cited

U.S. PATENT DOCUMENTS

| | | | |
|---|---|---|---|
| 6,735,548 B1 | 5/2004 | Huang et al. | |
| 6,912,221 B1 | 6/2005 | Zadikian et al. | |
| 7,002,917 B1 | 2/2006 | Saleh | |
| 7,031,262 B2 | 4/2006 | Vasseur et al. | |
| 7,051,113 B1 | 5/2006 | Katukam et al. | |
| 7,099,286 B1 | 8/2006 | Swallow | |
| 7,113,484 B1 | 9/2006 | Chapman et al. | |
| 7,197,040 B2* | 3/2007 | Bressoud et al. | 370/401 |
| 7,230,949 B2* | 6/2007 | Bharali et al. | 370/395.2 |
| 7,447,153 B2* | 11/2008 | Klinker | 370/231 |
| 7,489,866 B2* | 2/2009 | Ozugur et al. | 398/57 |
| 2005/0047353 A1* | 3/2005 | Hares | 370/255 |
| 2005/0132088 A1* | 6/2005 | Sridhar et al. | 709/249 |
| 2005/0188106 A1* | 8/2005 | Pirbhai et al. | 709/238 |
| 2006/0182035 A1* | 8/2006 | Vasseur | 370/238 |
| 2006/0209682 A1* | 9/2006 | Filsfils et al. | 370/219 |
| 2006/0215578 A1* | 9/2006 | Andrapalliyal et al. | 370/254 |

OTHER PUBLICATIONS

Rosen, E. et al., Request for Comments 4364, entitled "BGP/MPLS IP Virtual Private Netowrks (VPNs)", Network Working Group, IETF, Feb. 2006, pp. 1-44.

Sangli, S. et al., Request for Comments 4360, entitled "BGP Extended Communities Attribute", Netowrk Working Group, IETF, Feb. 2006, pp. 1-12.

(Continued)

*Primary Examiner*—John Pezzlo
(74) *Attorney, Agent, or Firm*—Cesari and McKenna, LLP

(57) ABSTRACT

In one embodiment, egress provider edge devices (PEs) send advertisements to ingress PEs for address prefixes of a first multi-homed customer network that desires path diversity through a service provider network to a second customer network. A first ingress PE receives the advertisements, and determines whether a second ingress PE is multi-homed with the first ingress PE to the second customer network. If so, the first ingress PE computes a plurality of diverse paths within the service provider network from the first and second multi-homed ingress PEs to a corresponding egress PE. If a plurality of diverse paths exists, the first ingress PE employs one of those paths to establish a first tunnel from itself to a first egress PE, and the second ingress PE employs another of the paths to establish a second tunnel from itself to a second egress PE that is diverse from the first tunnel.

20 Claims, 7 Drawing Sheets

OTHER PUBLICATIONS

Awduche, D. et al., Request for Comments 3209, entitled "RSVP-TE: Extensions to RSVP for LSP Tunnels", Network Working Group, IETF, Dec. 2001, pp. 1-57.

Smit, H. et al., Request for Comments 3784, entitled "Intermediate System to Intermediate System (IS-IS) Extensions for Traffic Engineering (TE)", Network Working Group, IETF, Jun. 2004, pp. 1-13.

Katz, D. et al., Request for Comments 3630, entitled "Traffic Engineering (TE) Extensions to OSPF Version 2", Network Working Group, IETF, Sep. 2003, pp. 1-14.

Vasseur, JP. et al., Internet-Draft, entitled "Path Computation Element (PCE) Communication Protocol (PCEP)—Version 1 (draft-ietf-pce-pcep-03.txt)", Network Working Group, IETF, Oct. 2006, pp. 1-61.

* cited by examiner

PATH DIVERSITY FOR CUSTOMER-TO-CUSTOMER TRAFFIC

TECHNICAL FIELD

The present disclosure relates generally to computer networks, and, more particularly, to path diversity through computer networks.

BACKGROUND

Computer networks may be used to communicate data between a sender and one or more receivers. The data, e.g., in the form of one or more packets, traverses paths that comprise network elements, such as nodes and links, between the sender and the receiver, generally along a computed shortest path between the sender and receiver based on one or more path metrics (e.g., cost). Some computer networks may remove network elements from path computation that do not meet certain criteria (e.g., constraints), such that no network element along the computed path fails to meet the criteria.

Often, customers may desire configuration of a private network to protect the privacy and security of their data within the private network. Sometimes, however, a customer may have multiple network locations that are distanced from one another in such a way that to maintain a private network, substantial costs (e.g., monetary) may be required. A Virtual Private Network (VPN) is a private data network that utilizes public networks to enable communication between distanced members of the same VPN (e.g., the customer's private network). For instance, privacy may be maintained between customer networks that span the public networks (e.g., a service provider network) through the use of various tunneling protocols and security features, as will be understood by those skilled in the art. Illustratively, a source device (sender) in a one customer network may wish to send data to a destination device (receiver) in another customer network of the same VPN across the service provider (e.g., public) network. Accordingly, the source transmits the data (traffic) to a customer edge device (CE) of the source device's customer network, which is in communication with an ingress provider edge device (PE) of the provider network. The service provider network (e.g., a "core") transmits the traffic to an egress PE interconnected with a CE of the customer network that has the destination device, and that CE forwards the traffic toward the destination device.

Some customers desire path diversity for site-to-site (customer-to-customer) traffic, i.e., where two or more paths between the customer networks exist that do not share network elements (nodes or links). For instance, path diversity may be driven by customers that require dual attachment to the service provider's core network for critical application needs (such as, e.g., financial institutions). Typically, such customers utilize multiple (e.g., dual) connections via diverse links connected to diverse PEs (which may or may not be co-located on a same physical device). Path diversity may be used to ensure that in the event of a single path failure (e.g., an element along the path), another diverse path is able to carry the flow of traffic between the customer networks. Path diversity may also be used for load-balancing traffic (e.g., also so that a failure along one path does not effect both paths) and other reasons as will be understood by those skilled in the art.

One problem associated with path diversity for customers that are "multi-homed" to the service provider network (i.e., have multiple connections to the provider network) is that such diversity cannot be guaranteed simply through local customer network interconnection with multiple diverse PEs. That is, in order to send different traffic flows to the diverse PEs (ingress PEs) for one or more destination address prefixes, the ingress PEs typically forward the traffic into the provider network core; however, there is no guarantee inside the core that the paths remain diverse. In other words, the paths inside the service provider network, although originating at diverse ingress PEs, may share a resource (network element) or may converge to a same egress PE, the failure of either of which adversely impacts both flows.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
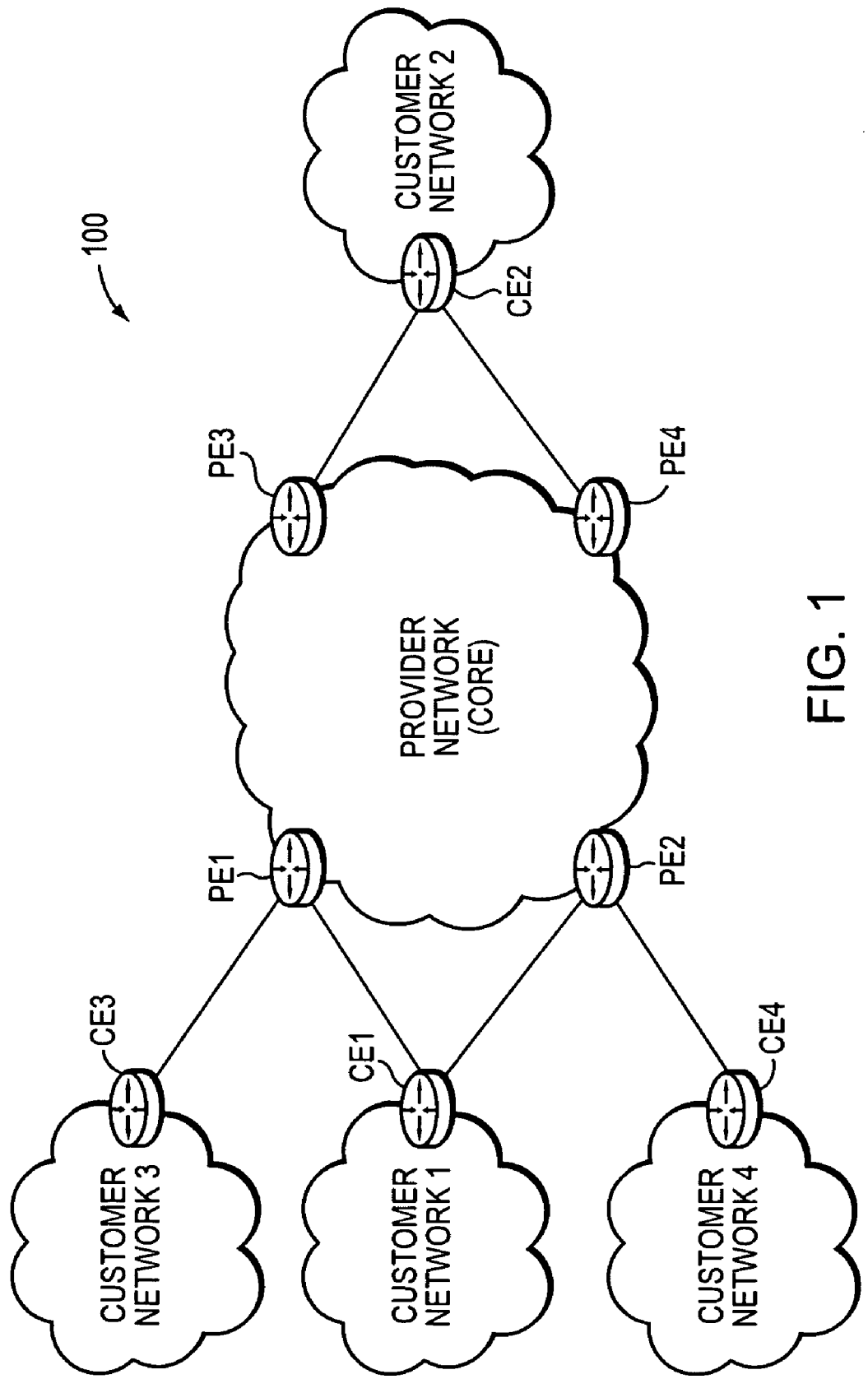
FIG. 1 illustrates an example computer network.

According to embodiments of the disclosure, a plurality of egress provider edge devices (PEs) sends advertisements to a plurality of ingress PEs for one or more address prefixes of a first multi-homed customer network that desires path diversity through a service provider network to a second customer network. A first ingress PE receives the plurality of advertisements, and determines whether at least a second ingress PE is multi-homed with the first ingress PE to the second customer network. If so, the first ingress PE computes a plurality of diverse paths within the service provider network from at least the first and second multi-homed ingress PEs to a corresponding egress PE of the plurality of egress PEs. If a plurality of diverse paths exists, the first ingress PE employs one of those paths to establish a first tunnel from itself to a first egress PE of the plurality of egress PEs, and the second ingress PE employs another of the paths to establish a second tunnel from itself to a second egress PE of the plurality of egress PEs that is diverse from the first tunnel.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN.

Network nodes belonging to the same VPN may be situated in different subnetworks, or "customer sites" (or "customer networks" interchangeably herein). Each customer site may participate in one or more different VPNs, although most often each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another.

The customer sites typically communicate with one another through a service provider network ("provider network"). The provider network is an AS that functions as a backbone network through which VPN information may be exchanged between customer sites. The provider network may include both provider edge devices (PEs), which function as ASBRs at the logical outer edge of the provider network, as well as provider (P) devices situated within the interior ("core") of the provider network. Accordingly, each customer site contains at least one customer edge device (CE) coupled to a PE in the provider network. The customer site may be multi-homed to the provider network, i.e., wherein one or more of the customer's CEs is coupled to a plurality of PEs. The PE-CE data links may be established over various physical media, such as conventional wire links, optical links, wireless links, etc., and may communicate data formatted using various network communication protocols including ATM, Frame Relay, Ethernet, Fibre Distributed Data Interface (FDDI), etc.

FIG. 1 is a schematic block diagram of an example computer network 100 illustratively comprising nodes/devices, such as in accordance with a VPN configuration described above. Illustratively, a provider network (e.g., having P devices, not shown) may be used to interconnect customer networks/sites 1-4 accordingly. For instance, PE1 may interconnect with CE3 for customer network 3 (e.g., having customer devices, such as sources and destinations, not shown) and CE1 for customer network 1, while PE2 may also interconnect with CE1 (i.e., CE1 is multi-homed to PE1 and PE2, or, stated differently, PE1 is multi-homed with PE2 to CE1), and additionally to CE4 for customer network 4. Further, PE3 and PE4 may be multi-homed with CE2 for customer network 2, as shown. As used herein, an "ingress PE" refers to a PE that may be used by the CEs to forward traffic into the provider network, and an egress PE refers to a PE that forwards traffic out of the provider network to a CE. Note that generally all PEs are both ingress and egress PEs, but for purposes of illustration, when referring to the directional flow of data (traffic), certain PEs may be ingress PEs, while others may be egress PEs, as described herein. Those skilled in the art will understand that any number of nodes, devices, links, etc. may be used in the computer network, and that the view shown herein is for simplicity. Those skilled in the art will also understand that while the embodiments described herein relate to customer and provider networks and VPNs, they may also apply to any network configuration, such as within an Autonomous System (AS) or area, or throughout multiple ASes or areas, etc.

Data packets 140 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

In a common VPN deployment, provider networks often provide the customer sites with layer-3 network-based VPN services that utilize IP and/or Multi-Protocol Label Switching (MPLS) technologies. These networks are typically said to provide "MPLS/VPN" services. This widely-deployed MPLS/VPN architecture is generally described in more detail in the IETF publication RFC 4364, entitled *BGP/MPLS IP Virtual Private Networks (VPNs)*, by E. Rosen et al., published February 2006, which is hereby incorporated by reference as though fully set forth herein.

Figure 2:
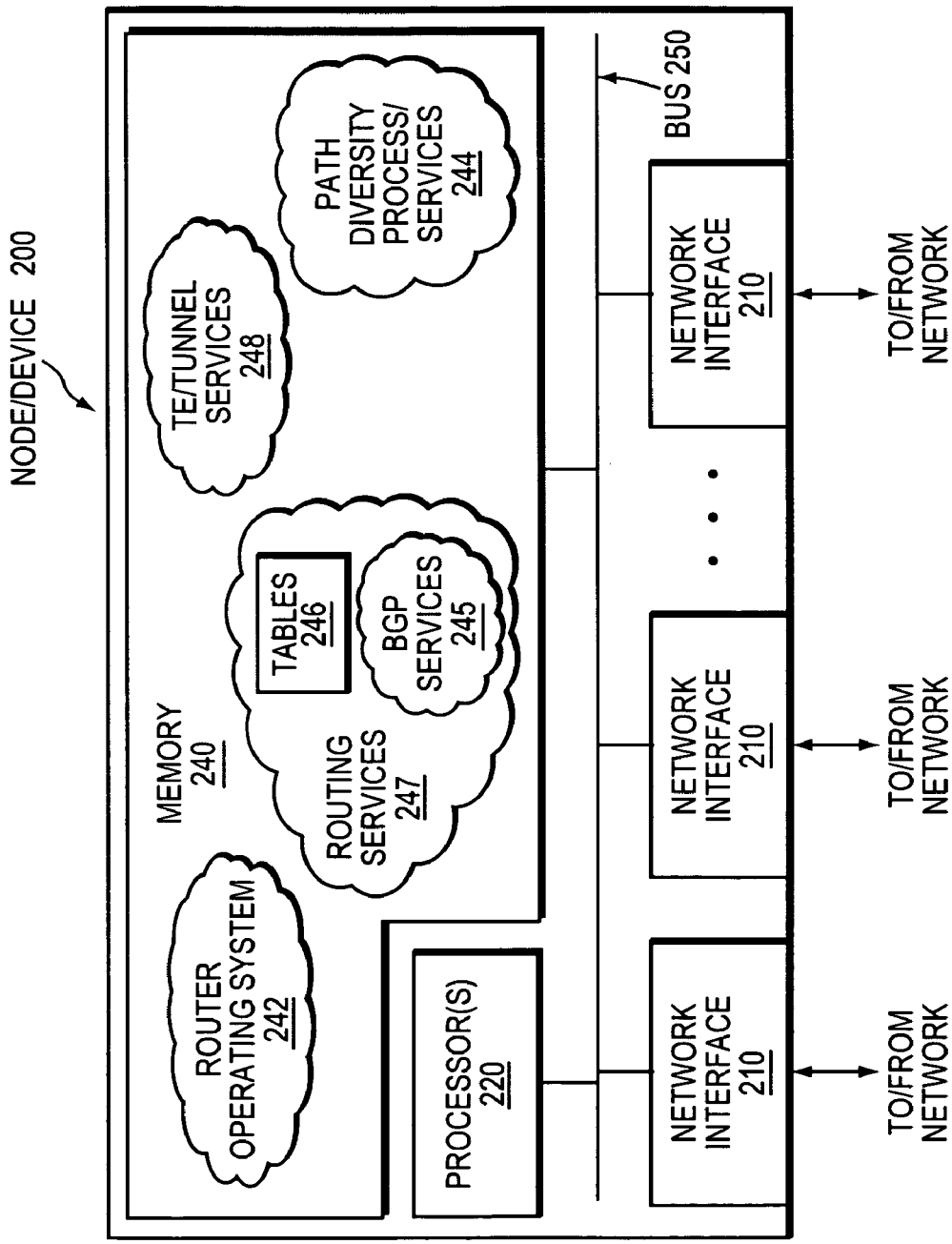
FIG. 2 illustrates an example network device/node.

FIG. 2 is a schematic block diagram of an example node/device 200 that may be advantageously used with one or more embodiments described herein, e.g., as a provider and/or customer edge device (PE and/or CE). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety is of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as one or more tables 246. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 247, Border Gateway Protocol (BGP) services 245, Traffic Engineering (TE)/Tunnel services 248, and a path diversity process/services 244, as described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the BGP (e.g., as BGP services 245), etc., as will be understood by those skilled in the art. These functions may be configured to manage tables 246, such as routing and forwarding tables containing, e.g., data used to make routing and forwarding decisions. Notably, routing services 247 may also perform functions related to virtual routing protocols, such as maintaining virtual routing and forwarding (VRF) instances (e.g., of tables 246) as will be understood by those skilled in the art.

BGP services 245 may be used during communication of network reachability information among devices 200 between the customer and provider networks, such as through the transmission and analysis of BGP advertisements. Suppose, for example, that a new address prefix is established within a network (e.g., an AS) or a new connection is created between the provider network and/or the one or more customer networks. Once the change in the network's state is detected by one of the BGP enabled devices, that device may transmit a BGP advertisement communicating the change to the other networks (ASes). BGP services 245 of other network nodes receive the advertisements, update their internal routing/reachability information, and may continue to transmit BGP advertisements with the new information as understood by those skilled in the art.

Figure 3:
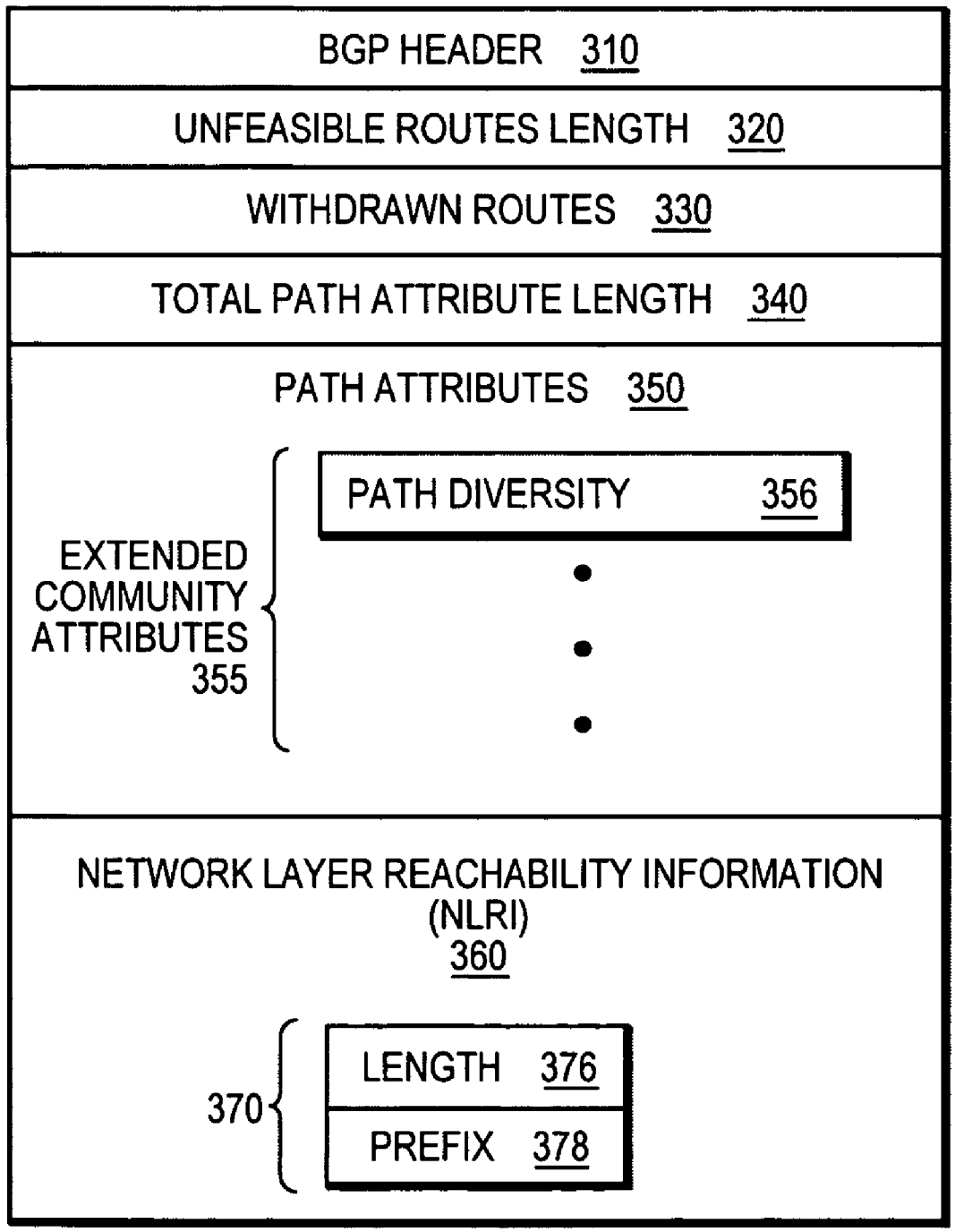
FIG. 3 illustrates an example BGP advertisement.

FIG. 3 illustrates an example BGP advertisement 300 that may be transmitted by BGP enabled routers 200 (e.g., PEs as described herein). Illustratively, the BGP advertisement 300 is a BGP update message. The packet includes a BGP header 310, unfeasible routes length field 320, withdrawn routes field 330, total path attribute length field 340, path attributes field 350, and network layer reachability information (NLRI) field 360. The BGP header 310 contains the type of BGP message (e.g., an update message), the overall length of the message, and other known information, such as predictable authentication data. The unfeasible routes length field 320 denotes the variable length of the withdrawn routes field 330, which contains a list of routes that are no longer used (or advertised) by the advertising BGP node. Notably, if the update message 300 only advertises feasible routes, the withdrawn routes field 330 need not be present.

The total path attribute length field 340 indicates the variable length of the path attributes field 350. Path attributes field 350 contains a sequence of optional path attributes, each attribute defining an attribute type, attribute length, and attribute value, such as, e.g., a multi-exit discrimination (MED) attribute (not shown). The MED attribute is a well-known optional non-transitive attribute that is generally used to discriminate among multiple exit or entry points to the same neighboring AS. Other attributes may be included within the Path attributes field 350, such as BGP extended community attributes 355 (e.g., a novel "Path Diversity" attribute 356 as described below). As will be understood by those skilled in the art, each BGP attribute and extended community attribute may be defined with a specific type value. Particularly, BGP extended community attributes are described further in RFC 4360, entitled *BGP Extended Communities Attribute*, dated February 2006 by Sangli et al., which publication is publicly available through the IETF and is hereby incorporated by reference in its entirety.

The Network Layer Reachability Information (NLRI) field 360 contains a list of address prefixes, whose length is calculated using the overall length of the BGP message 300 contained within the BGP header 310. Reachability information in the NLRI field 360 comprises one or more encoded entries 370, each containing a length field 376 signifying the length of a prefix field 378. The prefix field 378 contains destination address prefixes that are reachable via, e.g., the originating (advertising) node, as described herein. Notably, a prefix 378 of zero length indicates a prefix that matches all destination addresses. In general, BGP update message 300 can advertise at most one route to a set of destination prefixes, and all path attributes 350 (and extended community attributes 355) apply to the entire set of destination prefixes contained in the NLRI field 360.

As mentioned above, the provider network may employ MPLS/VPN services. MPLS Traffic Engineering (TE) has been developed to meet data networking requirements such as guaranteed available bandwidth and/or fast restoration (Fast Reroute, FRR). MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

TE/Tunnel services 248 contain computer executable instructions for implementing TE and/or tunneling functions in accordance with the embodiments described herein. For instance, services 248 may provide one or more protocols useful for establishing and maintaining tunnels and their associated operation, such as, e.g., MPLS, MPLS-TE, the Resource ReSerVation Protocol (RSVP), etc., as will be understood by those skilled in the art. For example, as used herein, tunnel services 248 may be used to establish, maintain, and operate the Point-to-Multi-Point (P2MP) tunnel tree of network 100. Notably, RSVP is a network-control protocol that enables applications to reserve resources in order to obtain special "quality of service" (QoS) for their data flows.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a path computation element (PCE) not co-located on the head-end node. The head-end node (or a PCE) exploits its knowledge of network topology and resources available on each link to perform the path computation according to the LSP Traffic Engineering constraints. Various path computation methodologies are available including CSPF (constrained shortest path first).

As noted, path diversity is generally not guaranteed through the provider network for customer networks that are multi-homed to the provider network (e.g., customer networks 1 and 2). In particular, in order to send different traffic flows to the diverse PEs (egress PEs) for one or more destination address prefixes, the ingress PEs merely forward traffic into the provider network core; however, there is no guarantee inside the core that the paths remain diverse. This is often also true for provider networks that have established tunnels between ingress and egress PEs, since the tunnels may merge, cross, etc., and the diverse ingress PEs (e.g., PE3 and PE4) may use a tunnel to reach the same egress PE (e.g., PE1). In other words, the paths inside the provider network, although originating at diverse ingress PEs, may share a resource or may converge to a same egress PE, the failure of either of which adversely impacts both flows.

Guaranteed Customer-to-Customer Path Diversity

According to embodiments of the disclosure, a plurality of egress provider edge devices (PEs) sends advertisements to a plurality of ingress PEs for one or more address prefixes of a first multi-homed customer network that desires path diversity through a service provider network to a second customer network. A first ingress PE receives the plurality of advertisements, and determines whether at least a second ingress PE is multi-homed with the first ingress PE to the second customer network. If so, the first ingress PE computes a plurality of diverse paths within the service provider network from at least the first and second multi-homed ingress PEs to a corresponding egress PE of the plurality of egress PEs. If a plurality of diverse paths exists, the first ingress PE employs one of those paths to establish a first tunnel from itself to a first egress PE of the plurality of egress PEs, and the second ingress PE employs another of the paths to establish a second tunnel from itself to a second egress PE of the plurality of egress PEs that is diverse from the first tunnel.

Referring again to FIG. 1, a plurality of egress PEs, e.g., PE1 and PE2, learn of one or more address prefixes (e.g., "x.1" and "x.2") of a first customer network (e.g., customer network 1), which network desires path diversity for traffic sent toward those prefixes. (For illustration, assume control-plane functionality in the direction from customer network 1 to customer network 2, and traffic flow in the direction from customer network 2 to customer network 1.) For instance, the egress PEs may be statically configured with the address prefixes, or may dynamically learn the address prefixes from a multi-attached (-homed) CE (e.g., CE1) of the customer network 1, such as from a CE-PE BGP session, as will be understood by those skilled in the art. The advertised address prefixes may indicate the desire for path diversity (e.g., such that only those so indicating desire path diversity), or the receiving PEs may be configured to provide for path diversity for all prefixes of the customer network assuming the customer is multi-homed (which may be statically configured or dynamically discovered).

The egress PEs (PE1 and PE2) may then send advertisements through the provider network to a plurality of ingress PEs (e.g., PE3 and PE4) for the one or more address prefixes (x.1 and x.2). Illustratively, the PEs of the provider network are configured with BGP sessions to the other PEs (or to Route Reflectors), as will be understood by those skilled in the art (e.g., an "interior BGP" or "iBGP" session). Accordingly, a BGP advertisement 300 may be used to advertise the prefixes. Within the BGP advertisement for the address prefixes that desire path diversity, a novel "Path Diversity" extended community attribute 356 (of BGP extended community attributes 355) may be used to indicate the desire for path diversity (e.g., through one or more codes, flags, etc.). In particular, the NLRI 360 may carry the address prefixes 378, and in accordance with one or more embodiments described below, the Path Diversity extended community attribute 356 may also carry the originating CE address of the prefix (e.g., the IP address of CE1), to be used as described below. Notably, path diversity for the customer network (e.g., for particular prefixes x.1 and x.2 of the customer network) may be configured at the egress PEs within a VRF (e.g., table 246) associated with the first customer network 1 (e.g., CE1), as will be appreciated by those skilled in the art. This configuration may thus be used to specify which customer networks (which CEs) have path diversity requirements and is enabled at the interface level. In this manner, prefixes advertised by PE1 for CE3 and PE2 for CE4 do not include a request for path diversity accordingly.

Upon receipt of the advertisements (e.g., BGP advertisements 300) sent from the plurality of egress PEs, a first ingress PE (e.g., PE3) notes that path diversity is desired for the included prefixes x.1 and x.2 through inspection of the Path Diversity extended community attribute 356. In response, the first ingress PE3 may determine whether it is possible to compute diverse paths from a customer network attached to the first ingress PE3 (e.g., customer network 2). For instance, the first ingress PE3 may determine whether routes to the advertised address prefixes x.1 and x.2 have been advertised from a plurality of diverse egress PEs. The first ingress PE3 may also check whether the originating CE address (the first CE1, e.g., as discovered through the Path Diversity extended community attribute 356), or at least the originating customer network 1, is the same for the advertisements received from the plurality of diverse egress PEs. Further, the first ingress PE3 may determine whether any of its locally attached customer networks, particularly, CEs (e.g., CE2), are multi-homed with at least a second ingress PE (e.g., PE4). For example, PE3 may discover that PE4 is advertising the same CE2 and, thus, CE2 is attached to both ingress PEs, as will be understood by those skilled in the art. In the event any of the above conditions are not met, it may be determined that diverse paths between a locally attached customer network 2 of the ingress PE and the originating customer network 1 of the address prefixes desiring path diversity are not possible.

If, on the other hand, diverse paths are possible, the first ingress PE3 may attempt to compute a plurality of diverse paths from itself and at least one other ingress PE that is multi-homed to the customer network 2 with PE3 (e.g., PE4). (Notably, while one or more embodiments may determine whether it is possible to compute diverse paths between customer networks prior to computing the diverse paths, other embodiments may simply attempt to compute the diverse paths, which if fail, indicates that diverse paths are not possible.) Illustratively, the first ingress PE3 computes a set of zero bandwidth diverse paths from each ingress PE (PE3 and PE4) to a corresponding egress PE (PE1 and PE2). (Notably, a path requiring no bandwidth may be used to maintain diverse paths, but need not reserve any bandwidth. Those skilled in the art will understand that bandwidth may be reserved along the diverse paths, but is not necessary for one or more embodiments described herein.) For example, various diverse path computation algorithms/strategies may be run, such as the known Bhandari algorithms, etc. For instance, the first ingress PE3 may attempt to compute a set of diverse paths whose sum of the costs of the paths is minimized.

Once the diverse paths are successfully computed (i.e., thus determining that a plurality of diverse paths exists), the first ingress PE3 may establish a first tunnel from itself to a first egress PE (e.g., PE1) of the plurality of egress PEs. Because the first ingress PE3 has already computed diverse paths, a diverse path that was computed as originating at the first ingress PE3 may be used to establish the first diverse tunnel ("T1") to the first egress PE1. Illustratively, the tunnel may be an MPLS TE-LSP (e.g., zero bandwidth), or other tunnels as will be understood by those skilled in the art. Notably, in the event such diverse paths already exist as established tunnels between the second customer network and first customer network (e.g., between the same pairs of ingress and egress PEs), the established tunnels may be used without a need for establishing new tunnels accordingly.

Upon (or before) establishing the first tunnel, the first ingress PE3 may send a notification to at least the second ingress PE (PE4) requesting that the second ingress PE4 establish a second tunnel to a second egress PE (e.g., PE2) that is diverse from the first tunnel. Notably, notifications (e.g., notifications and/or requests/responses described herein) may be illustratively exchanged between the ingress PEs in accordance with a protocol specified in Vasseur, et al., *Path Computation Element (PCE) Communication Protocol (PCEP)-Version* 1-<draft-ietf-pce-pcep-03.txt>, Internet Draft, October 2006, the contents of which are hereby incorporated by reference in their entirety. It should be understood that the use of PCEP serves only as an example, and that other communication protocols may be used in accordance with the embodiments described herein.

Figure 4:
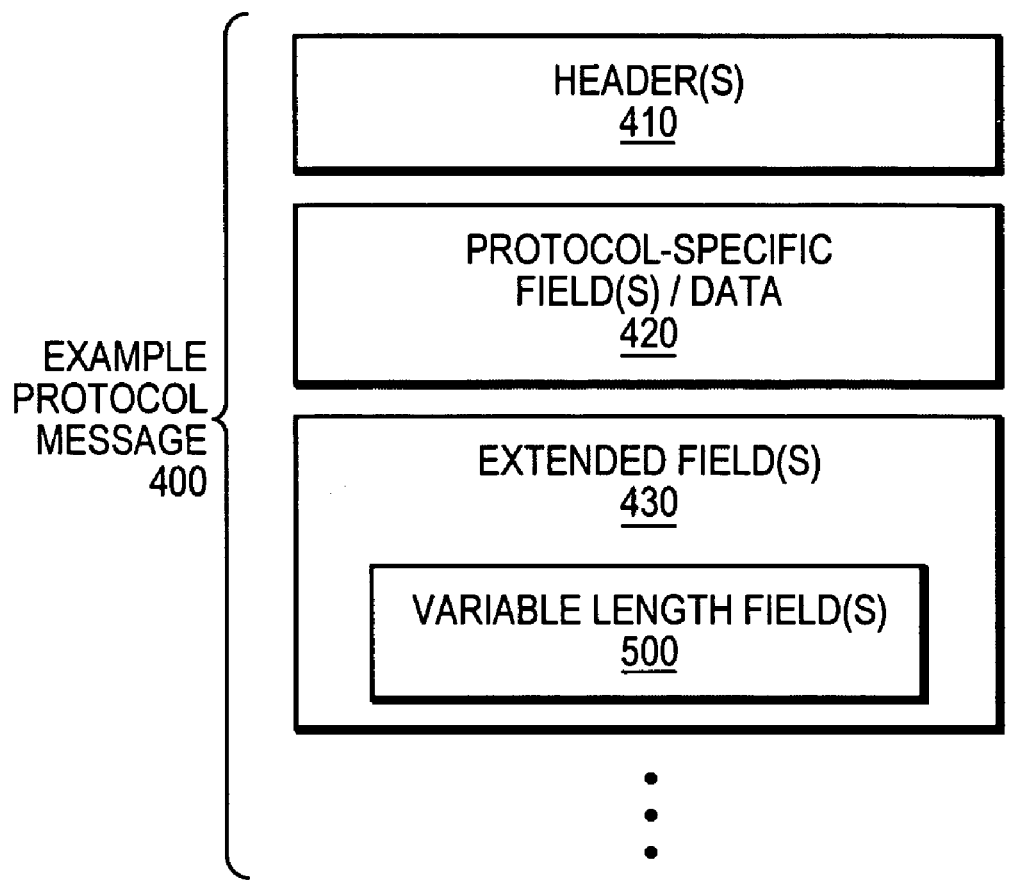
FIG. 4 illustrates an example generic protocol message.

FIG. 4 is a schematic block diagram illustrating a generic protocol message 400 is that may be transmitted by nodes/devices 200 (e.g., ingress PEs) according to various protocols in accordance with the embodiments described herein, e.g., a PCEP message 400, etc. Illustratively, the message 400 is shown as a high-level generic message, and those skilled in the art will understand that more specific messages may comprise other fields accordingly. The message 400 includes one or more headers 410, such as an encapsulation protocol header as well as one or more protocol-specific headers (e.g., IP headers, RSVP headers, etc.). As those skilled in the art will understand, the message 400 is sent in an encapsulation appropriate to the environment (e.g., TCP/IP, ATM, MPLS, etc.). Thus, the encapsulation protocol header of headers 410 contains information standard for the specific type of encapsulation. Protocol-specific fields/data 420 may be used to contain protocol-specific information, as will be understood by those skilled in the art. For example, a PCEP message 400 may communicate PCEP-specific information between the ingress PEs accordingly, as described herein. Regardless of the protocol, the extended field(s) section 430 (e.g., an extension to protocol-specific fields) may include one or more variable length fields (TLVs) 500, to be used in accordance with one or more embodiments described herein.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 5:
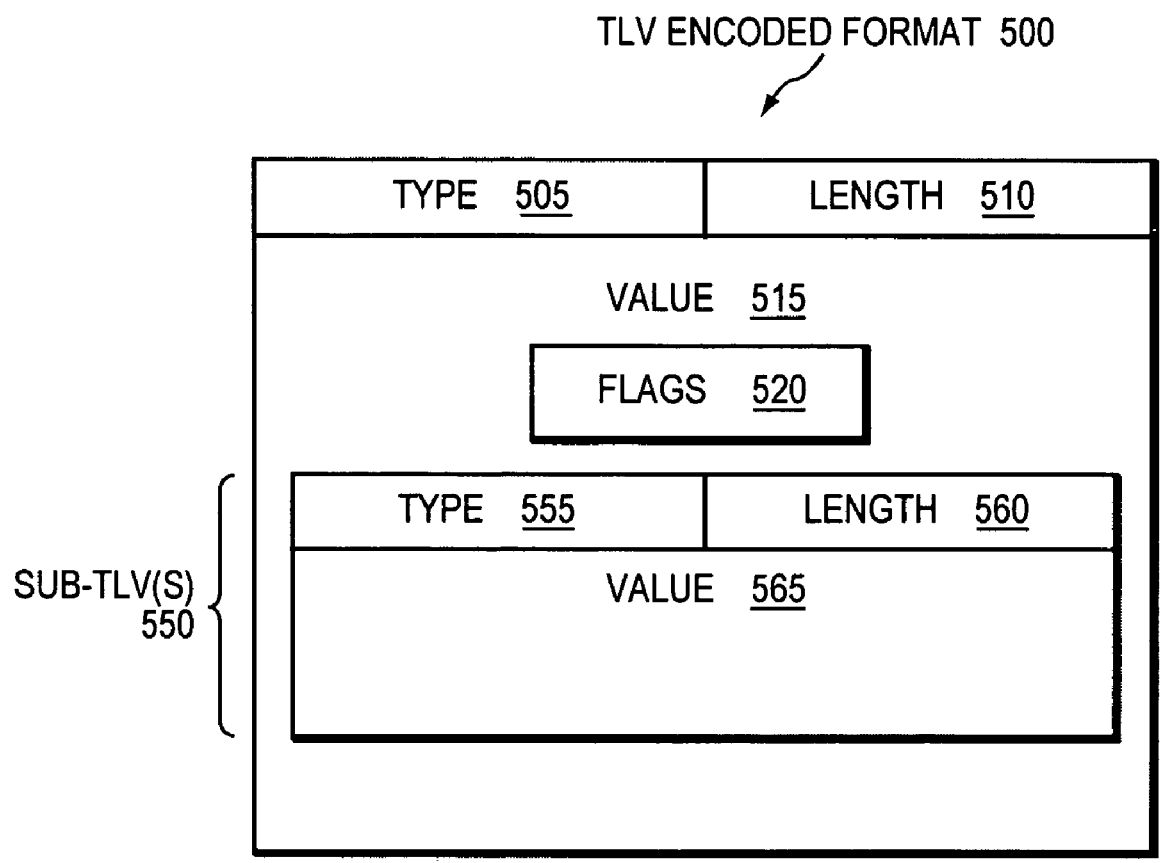
FIG. 5 illustrates an example TLV encoded format.

FIG. 5 is a schematic block diagram illustrating the TLV encoded format 500 that may be advantageously used with the one or more embodiments described herein. The TLV 500 is organized to include a Type field 505 containing a predetermined type value indicating the type of data contained in the TLV 500, and a Length field 510, which is a variable length value. The TLV encoded format 500 may also comprise one or more non-ordered sub-TLVs 550 carried within the TLV "payload" (e.g. Value field 515), each having a Type field 555, Length field 560, and Value field 565. Notably, other information may be contained within Value field 515 (and/or 565), such as, e.g., one or more flags in Flags field 520. The fields of the TLV 500 and sub-TLV(s) 550 are used in a variety of manners, including as described herein, according to the embodiments described herein.

Figure 6:
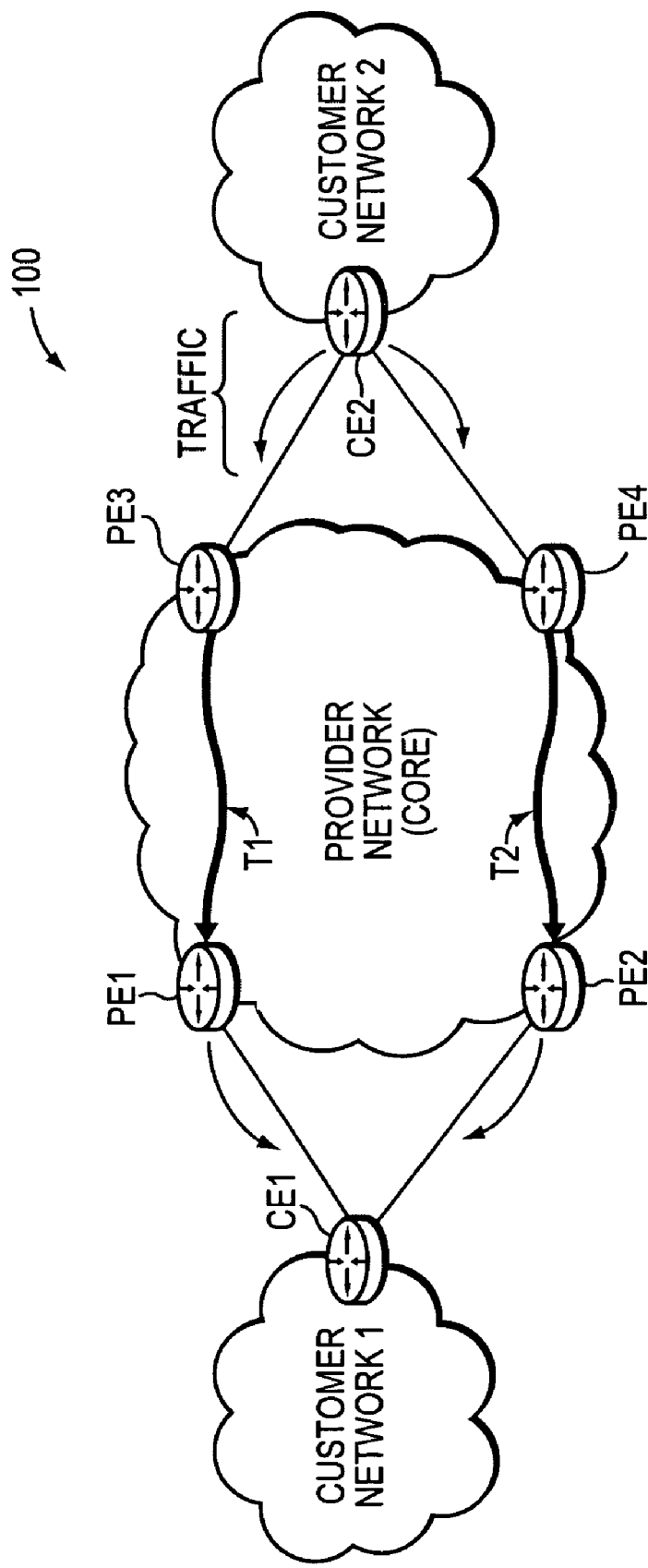
FIG. 6 illustrates an example computer network having diverse paths/tunnels for customer-to-customer traffic.

According to one or more embodiments, the first ingress PE3 may send a notification (e.g., PCEP message 400) to the second ingress PE4 to inform the second PE4 of a second diverse path that was computed by first ingress PE3 as described above. The second ingress PE4, in response, may then use the second diverse path as computed by the first ingress PE3 for establishment of a second tunnel (e.g., "T2") from itself to the second egress PE2 (e.g., again a zero bandwidth tunnel). Alternatively, the first ingress PE3 may compute a plurality of first paths to verify that diverse paths exist, and then may send a notification (e.g., PCEP message 400) to the second ingress PE4 to request that second ingress PE4 compute its own path that is diverse from the path of the first tunnel T1. In order to ensure diverse paths, the notification message (400) may include the path of the first tunnel T1, such that the second ingress PE4 may correspondingly compute a path that is diverse. The computed path may then be used to establish the second tunnel T2 accordingly. FIG. 6 illustrates the computer network 100 of FIG. 1 having diverse paths/tunnels (T1 and T2) through a provider network for customer-to-customer traffic in accordance with one or more embodiments described herein (e.g., without customer networks 3 or 4 for clarity).

In the event that the second ingress PE4 is unable to successfully establish the second tunnel T2, the second ingress PE4 may send a notification (e.g., PCEP message 400) to the first ingress PE3 indicating as such. In response, the first ingress PE3 may select another (third) ingress PE (not shown) that is multi-homed with the first ingress PE3 to the second customer network 2 (e.g., CE2) to attempt to establish a diverse tunnel (e.g., still the "second diverse tunnel") to the first customer network 1. Alternatively (or in addition), the first PE may also reroute its first tunnel T1 over a different path within the provider network in the event it may help establishment of a second diverse tunnel T2, e.g., from either the second ingress PE4 or third ingress PE accordingly. For instance, if the first tunnel T1 is established in a way that prevents other diverse tunnels from being established, the first tunnel T1 may be rerouted (relocated) along a different path accordingly. Also, if no diverse paths exist (e.g., if the first ingress PE3 did not first determine that diverse paths exist, or if the topology of the provider network has changed since establishment of the first tunnel T1, or if other reasons prevent establishment of a second diverse tunnel T2, etc.), the first ingress PE3 may simply log an error, which may or may not be returned to the first customer network 1 and/or egress PEs.

Once the first and second diverse tunnels are established (e.g., T1 and T2 as shown in FIG. 6), the second customer network 2 may send diverse traffic to the diverse ingress PEs (PE3 and PE4), and path diversity through the provider network to the first customer network 1 may be guaranteed accordingly (i.e., because the received traffic is encapsulated into the corresponding diverse tunnel). For example, the second CE2 may send diverse traffic on a per-prefix basis (e.g., x.1 to PE3 and x.2 to PE4), on a load-balancing basis (e.g., 50% of all traffic for x.1 and x.2 to PE3, 50% to PE4), etc. The ingress PEs receive the traffic, and encapsulate it into a corresponding diverse tunnel to the egress PEs. Notably, while the above description illustratively advertises address prefixes x.1 and x.2, a single address prefix may advantageously utilize customer-to-customer path diversity as well (e.g., for load-balancing, etc.). For example, CE2 may decide to send 50% of its traffic towards x.1 to PE3 and the other 50% to PE4, thus guaranteeing that in case of failure in the service provider network, only 50% of the traffic towards x.1 will be affected by that single failure. Also, more address prefixes may be included, e.g., an additional "x.3" prefix, and the diverse traffic forwarding may be distinguished again per prefix (e.g., x.1 and x.2 to PE3, and x.3 to PE4), or if more than two diverse paths are available (e.g., a third ingress PE), then each address prefix may utilize its own diverse tunnel, etc. That is, the customer networks (1 and/or 2) may utilize the guaranteed diverse paths through the provider network for any purpose so configured, and any forwarding of traffic to the diverse ingress PEs may be used in accordance with the embodiments described herein.

Figure 7:
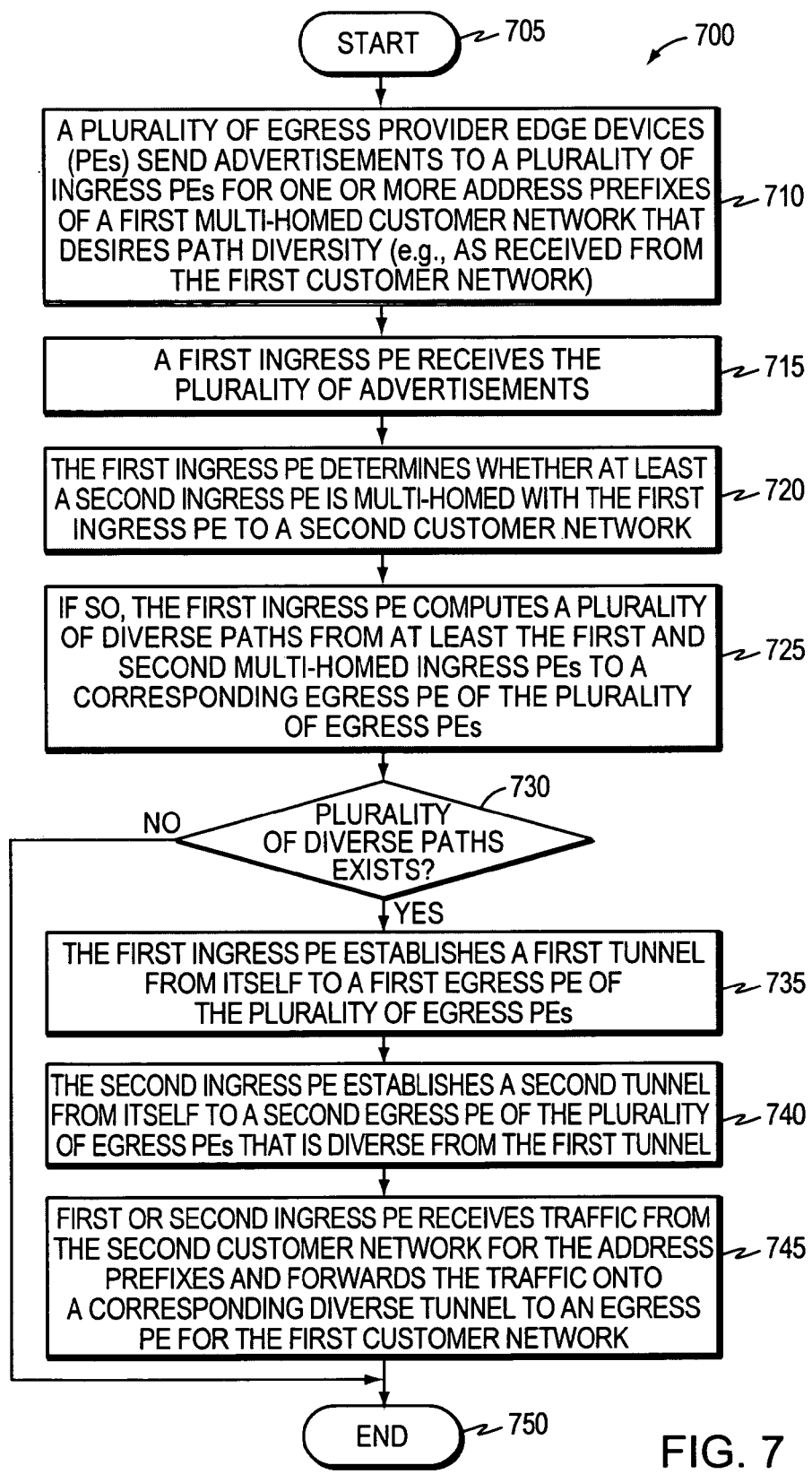
FIG. 7 illustrates an example procedure for customer-to-customer path diversity.

FIG. 7 illustrates an example procedure for customer-to-customer path diversity in accordance with one or more embodiments described herein. The procedure 700 starts at step 705, and continues to step 710, where a plurality of egress PEs (e.g., PE1 and PE2) sends advertisements (e.g., BGP advertisements 300) to a plurality of ingress PEs (e.g., is PE3 and PE4) for one or more address prefixes (e.g., x.1 and x.2) of a first multi-homed customer network (e.g., customer network 1) that desire path diversity through a provider network. As described above, the address prefixes and their desired path diversity may have been learned at the egress PEs from advertisements sent from the first customer network (e.g., from CE1), or they may have been statically configured at the PEs.

In step 715, a first ingress PE (PE3) receives the plurality of advertisements (e.g., one from each of PE1 and PE2), and determines in step 720 whether at least a second ingress PE is multi-homed with the first ingress PE to a second customer network (e.g., customer network 2). If so (e.g., CE2 is multi-homed to PE3 and PE4), the first ingress PE computes a plurality of diverse paths within the provider network from at least the first and second multi-homed ingress PEs to a corresponding egress PE of the plurality of egress PEs in step 725. The first ingress PE may determine whether a plurality of diverse paths exists in step 730, such as described above, e.g., whether there are multi-homed egress PEs, whether the advertisements originated at the same customer network, etc. If no diverse paths exist in step 730, the procedure 700 ends in step 750.

Conversely, if a plurality of diverse paths does exist in step 730, then the first ingress PE3 establishes a first tunnel (e.g., T1) from itself to a first egress PE (e.g., PE1) of the plurality of egress PEs in step 735, e.g., along a correspondingly computed path of step 725. Also, in step 740, the second ingress PE4 establishes a second tunnel (e.g., T2) from itself to a second egress PE (e.g., PE2) of the plurality of egress PEs that is diverse from the first tunnel. As described above, the second ingress PE4 may receive the diverse path to use for the second diverse tunnel from the first ingress PE3, or may be given the first tunnel and a request to compute a diverse path for the second tunnel accordingly. Note also that if the second ingress PE4 is unable to establish the second diverse tunnel (as mentioned above), the first ingress PE may adjust the first tunnel or may request a second diverse tunnel from another ingress PE (if available).

Once the first and second diverse tunnels (T1 and T2) are established, the first and/or second ingress PEs may receive traffic in step 740 from the second customer network (e.g., from CE2) for the advertised address prefixes desiring path diversity, and forwards the traffic onto a corresponding diverse tunnel to an egress PE for the first customer network. The procedure 700 ends in step 750 with the established diverse tunnels and corresponding traffic forwarding (switching) over the tunnels.

Advantageously, the novel techniques described herein provide for customer-to-customer path diversity in a computer network. By dynamically establishing diverse tunnels between multi-homed PEs, the novel techniques allow for a service provider network to guarantee end-to-end path diversity for traffic flowing between a pair of multi-homed customer networks (e.g., CEs). In particular, the techniques described above do not require any changes/configuration on the CE. Also, the dynamic aspects of one or more embodiments described herein alleviate the need for cumbersome and inefficient manual configuration.

While there have been shown and described illustrative embodiments that provide for customer-to-customer path diversity in a computer network, it is to be understood that various other adaptations and modifications may be made within the spirit and scope of the present invention. For example, the embodiments have been shown and described herein using various protocols for advertisements (e.g., BGP), tunneling (e.g., MPLS, RSVP, etc), notifications (PCEP, etc.), etc. However, the embodiments of the invention in their broader sense are not so limited, and may, in fact, be used with other suitable protocols, as will be understood by those skilled in the art. Also, while the description above illustratively utilizes diverse paths between two (or more)

ingress PEs and two (or more) egress PEs, path diversity through the provider network may also be available from two or more ingress PEs, such as from PE3 and PE4 (i.e., receiving diverse traffic flows from the second customer network 2) to a single egress PE (e.g., PE1). In this instance, path diversity is still guaranteed through the provider network, but ends at the egress PE (e.g., the tunnels T1 and T2 merge/converge at egress PE1), and not at the customer network (e.g., not at CE1).

Further, while the description above illustratively multi-homes a single CE per customer network to a plurality of PEs, an alternative embodiment may have a plurality of CEs interconnected correspondingly to a plurality of PEs. For instance, assume that is CE3 and CE4 belong to a same customer network "3/4" (not shown). Customer network 3/4 is then multi-homed to provider network through two CEs (CE3 and CE4) to two PEs (PE1 and PE2). Accordingly, CE3 and CE4 may advertise x.1 and x.2 toward PE1 and PE2 respectively. Separate Route Distinguisher (RD) allocation may be made at PE1 and PE2 and thus two separate VPNv4 routes are advertised to ingress PEs, as will be understood by those skilled in the art, and a novel BGP extended community attribute 355 may be defined that characterizes the site identifier (a "VPN-site-ID" extended attribute, not shown). The techniques described above may then be used in a similar manner to establish diverse tunnels within the provider network from customer network 2 to the customer network 3/4 (or, illustratively, from customer network 3/4 to customer network 2), as will be appreciated by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    sending advertisements from a plurality of egress provider edge devices (PEs) to a plurality of ingress PEs for one or more address prefixes of a first multi-homed customer network that desires path diversity through a provider network to a second customer network;
    receiving the plurality of advertisements at a first ingress PE;
    determining at the first ingress PE whether at least a second ingress PE is multi-homed with the first ingress PE to the second customer network;
    computing, in response at the first ingress PE, a plurality of diverse paths within the provider network from at least the first and second multi-homed ingress PEs to a corresponding egress PE of the plurality of egress PEs;
    determining whether a plurality of diverse paths exist;
    establishing a first tunnel from the first ingress PE to a first egress PE of the plurality of egress PEs in response to existence of a plurality of diverse paths; and
    establishing a second tunnel from the second ingress PE to a second egress PE of the plurality of egress PEs that is diverse from the first tunnel.

2. The method as in claim 1, further comprising:
    receiving traffic from the second customer network for the address prefixes desiring path diversity at one of the ingress PEs; and
    forwarding traffic of the address prefixes onto a corresponding tunnel established from the receiving ingress PE.

3. The method as in claim 1, further comprising:
    advertising the one or more address prefixes from the first multi-homed customer network to the plurality of ingress PEs.

4. The method as in claim 3, further comprising:
    advertising the one or more address prefixes from two or more customer edge devices (CEs).

5. The method as in claim 3, further comprising:
    advertising the one or more address prefixes from a customer edge device (CE) that is multi-homed to two or more egress PEs.

6. The method as in claim 1, further comprising:
    dynamically discovering the first multi-homed customer network at the plurality of egress PEs; and in response,
    sending the advertisements from the egress PEs for the one or more address prefixes.

7. The method as in claim 1, wherein the advertisements are extended community attributes for path diversity within a Border Gateway Protocol (BGP) advertisement.

8. The method as in claim 1, further comprising:
    determining, at the ingress PEs, that the advertisements for the first customer network are received from a plurality of egress PEs; and
    if so, establishing the first tunnel and the second tunnel that is diverse from the first tunnel.

9. The method as in claim 1, further comprising:
    determining, at the ingress PEs, that the first customer network is an originating customer network of the one or more address prefixes for the received plurality of advertisements; and
    if so, establishing the first tunnel and the second tunnel that is diverse from the first tunnel.

10. The method as in claim 1, wherein the first tunnel and the second tunnel that is diverse from the first tunnel reserve zero bandwidth.

11. The method as in claim 1, further comprising:
    determining, at the ingress PEs, that the first and second diverse tunnels already exist; and in response,
    using the existing first tunnel and the second tunnel that is diverse from the first tunnel.

12. The method as in claim 1, wherein the step of computing the plurality of diverse paths further comprises:
    minimizing a sum of costs of the plurality of diverse paths.

13. The method as in claim 1, further comprising:
    sending a notification from the first ingress PE to the second ingress PE, the notification to inform the second PE of a second path for the second tunnel from the second ingress PE to the second egress PE that was computed by the first ingress PE.

14. The method as in claim 13, further comprising:
    establishing the second tunnel along the second path from the second ingress PE to the second egress PE that was computed by the first ingress PE.

15. The method as in claim 1, further comprising:
    sending a notification from the first ingress PE to the second ingress PE, the notification to inform the second PE of the first tunnel and to request that the second ingress PE compute and establish the second tunnel from the second ingress PE to the second egress PE that is diverse from the first tunnel.

16. The method as in claim 1, further comprising:

determining, at the second ingress PE, that the second ingress PE is unable to establish the second tunnel to the second egress PE; and in response, sending a notification from the second ingress PE to the first ingress PE, the notification to indicate to the first ingress PE that the second ingress PE is unable to establish the second tunnel.

17. The method as in claim 16, further comprising:

determining whether a third ingress PE is multi-homed to the second customer network; and if so, establishing the second tunnel from the third ingress PE to the second egress PE that is diverse from the first tunnel.

18. The method as in claim 16, further comprising:

recomputing a first diverse path for the first tunnel from the first ingress PE to the first egress PE to allow a second diverse path from the second ingress PE to the second egress PE; and reestablishing the first tunnel along the recomputed first diverse path.

19. A node, comprising:

one or more network interfaces adapted to provide an ingress to a provider network for a second customer network;

one or more processors coupled to the network interfaces and adapted to execute one or more processes; and a memory adapted to store a path diversity process executable by each processor, the path diversity processes when executed adapted to: i) receive advertisements from a plurality of egress provider edge devices (PEs) for one or more address prefixes of a first multi-homed customer network that desire path diversity through the provider network to the second customer network; ii) determine whether the second customer network is multi-homed with a second ingress PE; iii) compute, in response, a plurality of diverse paths within the provider network from at least the node and the second multi-homed ingress PE to a corresponding egress PE of the plurality of egress PEs; iv) determine whether a plurality of diverse paths exist; v) establish a first tunnel from the node to a first egress PE of the plurality of egress PEs in response to existence a plurality of diverse paths; and vi) request that the second ingress PE establish a second tunnel from the second ingress PE to the second egress PE that is diverse from the first tunnel.

20. A system, comprising:

a plurality of egress provider edge devices (PEs) adapted to send advertisements for one or more address prefixes of a first multi-homed customer network that desire path diversity through a provider network to a second customer network;

a first ingress PE adapted to i) receive the plurality of advertisements, ii) determine whether at least a second ingress PE is multi-homed with the first ingress PE to the second customer network, iii) compute, in response, a plurality of diverse paths within the provider network from at least the first and second multi-homed ingress PEs to a corresponding egress PE of the plurality of egress PEs, iv) determine whether a plurality of diverse paths exist, and v) establish a first tunnel from the first ingress PE to a first egress PE of the plurality of egress PEs in response to existence a plurality of diverse paths; and a second ingress PE adapted to establish a second tunnel from the second ingress PE to a second egress PE of the plurality of egress PEs that is diverse from the first tunnel.

* * * * *

UNITED STATES PATENT AND TRADEMARK OFFICE
CERTIFICATE OF CORRECTION

PATENT NO. : 7,710,902 B2 Page 1 of 1
APPLICATION NO. : 11/604624
DATED : May 4, 2010
INVENTOR(S) : Jean-Philippe Vasseur It is certified that error appears in the above-identified patent and that said Letters Patent is hereby corrected as shown below:

Col. 4, Line 61, please amend as shown:

a variety [[is]] of different communication protocols, including,

Col. 9, Line 66, please amend as shown:

protocol message 400 [[is]] that may be transmitted by nodes/

Col. 11, Line 62, please amend as shown:

BGP advertisements 300) to a plurality of ingress PEs (e.g., [[is]]

Col. 13, Line 14, please amend as shown:

assume that [[is]] CE3 and CE4 belong to a same customer

Signed and Sealed this

Twenty-seventh Day of July, 2010

David J. Kappos
*Director of the United States Patent and Trademark Office*